United States Patent
Ramsdale et al.

(10) Patent No.: US 7,149,654 B2
(45) Date of Patent: Dec. 12, 2006

(54) SENSOR MEASUREMENT METHOD AND SYSTEM WITH UNIVERSAL DATA CONCENTRATORS

(75) Inventors: Kurt A Ramsdale, Glendale, AZ (US); Leroy E Vetsch, Glendale, AZ (US)

(73) Assignee: Honeywall International, Inc., Morristown, NJ (US)

( * ) Notice: Subject to any disclaimer, the term of this patent is extended or adjusted under 35 U.S.C. 154(b) by 86 days.

(21) Appl. No.: 10/848,493

(22) Filed: May 18, 2004

(65) Prior Publication Data

US 2006/0190202 A1     Aug. 24, 2006

(51) Int. Cl.
*G06F 15/16*     (2006.01)
(52) U.S. Cl. .......................... 702/182; 702/57; 702/77; 702/104; 702/108; 702/116; 702/187; 702/188; 702/189; 702/190; 324/73.1; 324/158.1
(58) Field of Classification Search ............... 702/182, 702/187–190, 33, 57, 75–77, 104, 108, 113–116, 702/124, 127; 324/73.1, 158.1
See application file for complete search history.

(56) References Cited

U.S. PATENT DOCUMENTS

| | | | |
|---|---|---|---|
| 4,831,438 A | * | 5/1989 | Bellman et al. ............ 348/148 |
| 5,600,576 A | | 2/1997 | Broadwater et al. |
| 6,238,338 B1 | * | 5/2001 | DeLuca et al. ............. 600/300 |
| 6,366,217 B1 | | 4/2002 | Cunningham et al. |
| 6,570,377 B1 | | 5/2003 | Demma ................. 324/207.26 |
| 2004/0178955 A1 | * | 9/2004 | Menache et al. ........... 342/463 |

FOREIGN PATENT DOCUMENTS

EP     0778688 A2     6/1997

OTHER PUBLICATIONS

PCT International Search Report: PCT/US2005/016997, Applicant Reference No. H0006087.65986, Dec. 20, 2005, EP International Search Authority, 6 pages.

* cited by examiner

*Primary Examiner*—Marc S. Hoff
*Assistant Examiner*—Phuong Huynh
(74) *Attorney, Agent, or Firm*—Ingrassia Fisher & Lorenz

(57) ABSTRACT

A measurement method and system in which a plurality of sensors are scattered about the system. One or more universal data concentrators are deployed in the areas where the sensors are concentrated. Each data concentrator is connected to one or more computers. Unique configuration data is provided to each data concentrator for its unique sensor type complement. Each data concentrator configures itself based on its configuration data. This allows the use of a universal data concentrator and, thus, one part number.

8 Claims, 3 Drawing Sheets

SENSOR MEASUREMENT METHOD AND SYSTEM WITH UNIVERSAL DATA CONCENTRATORS

FIELD OF THE INVENTION

This invention relates to a measurement system and method.

BACKGROUND OF THE INVENTION

Modern aircraft systems include a large number of sensors scattered over a variety of localized and remote locations. To reduce aircraft wiring, weight, cost, and complexity, aircraft systems designers are currently moving away from centralized electronics, where all sensors are wired back to one central location, in favor of a Remote Data Concentrator (RDC) concept. This concept minimizes aircraft wiring by remotely locating a number of RDCs near the areas of highest sensor concentration. This allows all nearby sensors to be connected by short cabling to one RDC, which is in turn connected to an aircraft data bus. Because there is a wide variety of sensor types, each with its unique interface requirements, an RDC may contain several unique and dedicated interface circuits, resulting in many different types of unique RDCs throughout an aircraft. Ideally, all RDCs for a specific aircraft application would be common, with a few spare circuits to handle the sensor interface variations from one location to another. This is rarely the case, so a practical compromise must be found between multiple RDC versions (part numbers), and multiple spare channels (several unused) to accommodate dissimilar sensor requirements at various locations. Both solutions add weight and cost that offset some of the advantage of the RDC approach. Thus, a problem that arises is how to reduce the number of different types of RDCs required without adding weight and cost.

SUMMARY OF THE INVENTION

The system and method of the present invention solves the aforementioned problem by providing a universal RDC with a versatile/configurable measurement circuitry that allows a single RDC part number to be used throughout the measurement system. The universal RDC is programmable according to a configuration file that identifies the sensor type that is connected to each channel of the RDC as well as the parameters of scaling, excitation signals and return signals for each sensor type. This enables the universal RDC to be used with a large number of different sensor types.

In one embodiment of the measurement system of the present invention, at least one computer provides configuration data to at least one data concentrator. The data concentrator comprises a processor and a plurality of channels that provide a universal interface for a plurality of sensor types. The configuration data includes an assignment of each of the channels to one of the sensor types. The processor runs a configuration program that configures the processor based on the assignment.

In another embodiment of the measurement system of the present invention, the processor, after being configured, runs a measurement procedure that via the channels provides sensor excitation signals and receives sensor return signals that are based on the assigned sensor types.

In another embodiment of the measurement system of the present invention, the processor executes discrete Fourier transform procedures to provide precision measurements over a broad range of configurable frequencies and amplitudes.

In another embodiment of the measurement system of the present invention, the configuration data further includes a configuration file that designates excitation signal parameters and sensor return signal characteristics for each sensor type. The processor generates the sensor excitation signals and processes the sensor return signals based on the excitation signal parameters and the sensor return signal characteristics.

In another embodiment of the measurement system of the present invention, the data concentrator is one of a plurality of substantially identical data concentrators. The configuration data is unique to each of the data concentrators.

In a method embodiment of the present invention, configuration data is provided to at least one data concentrator that comprises a processor and a plurality of channels that provide a universal interface to a plurality of sensor types. The configuration data includes an assignment of each of the channels to one of the sensor types. The processor and the channels are configured based on the assignment.

In another embodiment of the method of the present invention, a measurement procedure is run that via the channels provides sensor excitation signals and receives sensor return signals that are based on the assigned sensor types.

In another embodiment of the method of the present invention, the step of running uses discrete Fourier transform procedures to provide precision measurements over a broad range of configurable frequencies and amplitudes.

In another embodiment of the method of the present invention, the configuration data further includes a configuration file that designates excitation signal parameters and sensor return signal characteristics for each sensor type. A measurement procedure provides the sensor excitation signals and processes the sensor return signals based on the excitation signal parameters and the sensor return signal characteristics.

In another embodiment of the method of the present invention, the data concentrator is one of a plurality of substantially identical data concentrators. The configuration data is unique to each of the data concentrators.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
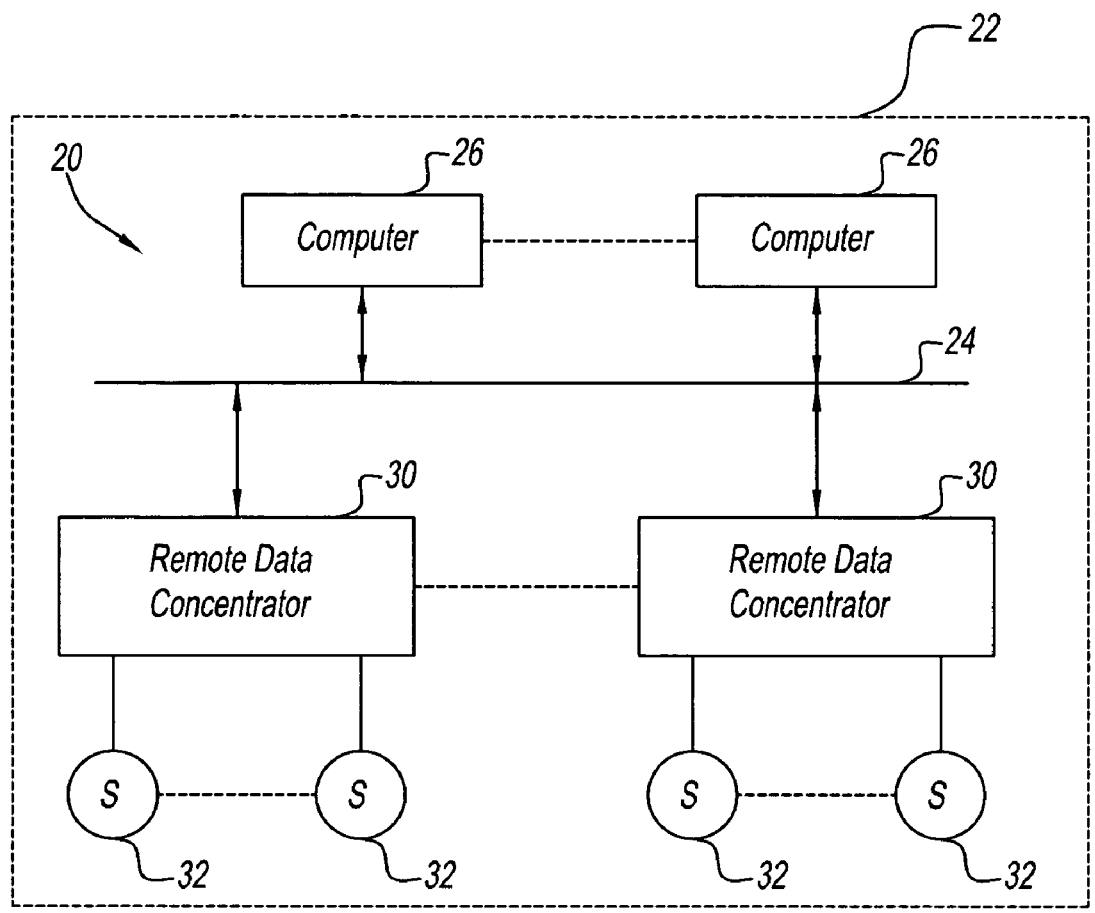
FIG. 1 is a block diagram of a universal sensor system of the present invention.

Referring to FIG. 1, a measurement system 20 of the present invention is shown in the environment of an aircraft 22. It will be appreciated by those skilled in the art that measurement system 20 can also be used in other environments that have multiple sensors scattered in a number of locations. For example, measurement system 20 may be used in other vehicular systems, such as ships, trains, space vehicles, tanks, trucks or a complex industrial control system.

Measurement system 20 includes a bus 24 that interconnects one or more computers 26 and a plurality of RDCs 30. Each RDC 30 is placed in a location that is in the vicinity of a plurality of sensors 32. These locations may be located near a computer 26 or remote from the computers 26. Computers 26 may be any suitable computers that process data. For example, computer 26 may be a personal computer, a workstation, a large data processor or any system component requiring the sensor data.

RDCs 30 are substantially identical (i.e., universal), but are individually configured based on configuration data that may be provided by one or more of computers 26. That is, the configuration data for each RDC is unique to the set or group of sensors 32 with which the RDC is connected.

Figure 2:
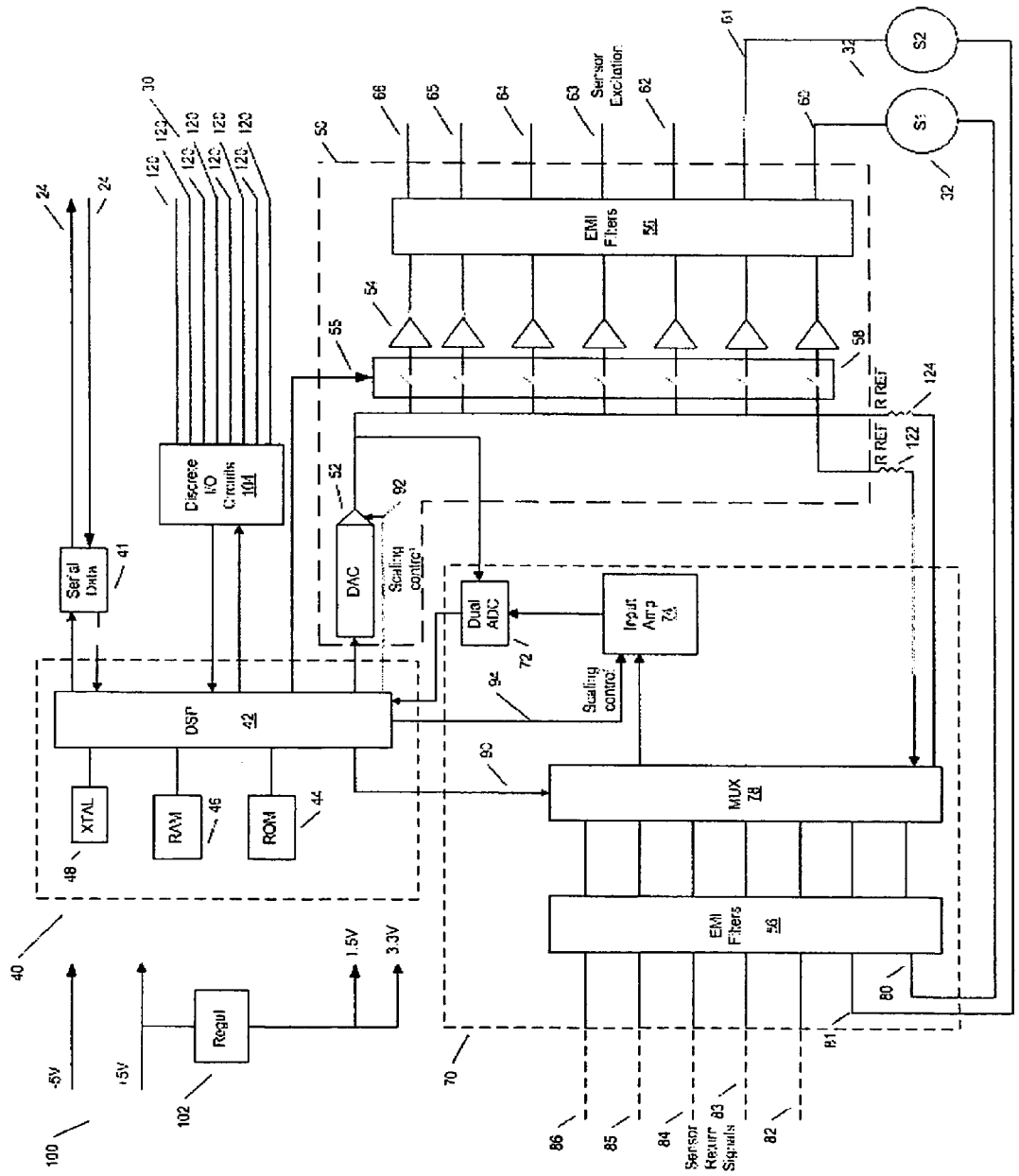
FIG. 2 is a block diagram of a remote data concentrator of the system of FIG. 1.

Referring to FIG. 2, RDC 30 includes a processing unit 40 that is connected with bus 24 via a serial data interface 41 and with a sensor excitation unit 50 and a sensor return signal unit 70. Processing unit 40 includes a digital signal processor 42, a read only memory (ROM) 44 and a random access memory (RAM) 46. A crystal oscillator 48 provides a clock signal to digital signal processor 42.

Sensor excitation signal unit 50 includes a digital to analog converter (DAC) 52, a set of amplifiers 54, electromagnetic interference (EMI) filters 56 and a set of selector switches 58. Sensor excitation signal unit 50 is arranged to provide excitation signals on a plurality of connectors 60, 61, 62, 63, 64, 65 and 66. To this end, DAC 52 converts a digital excitation signal provided by DSP 42 to an analog signal. Switches 58 respond to a selector signal from DSP 42 via a line 55 to provide excitation signals on one or more desired connectors.

Sensor return signal unit 70 includes an analog to digital converter (ADC) 72, an input amplifier 74, a multiplexer 78 and EMI filters 76. Sensor return signal unit 70 is arranged to receive sensor return signals on a plurality of channels or connectors 80, 81, 82, 83, 84, 85 and 86. EMI filters 76 filter EMI from the sensor return signals. Multiplexer 78 is controlled via a connection 90 from DSP 42 to select one of the sensor return signals for connection to input amplifier 74. The amplified sensor return signal is converted from analog to digital by ADC 72 for application to DSP 42 at a rate sufficient to characterize the waveform as needed (i.e. 1 MHz for most applications) and to accommodate the noise environment.

Each of connectors 60–66 and connectors 80–86 is intended for connection with a sensor 32. For example, connectors 60 and 80 and connectors 61 and 81 are connected in circuit with the sensors designated as S1 and S2, respectively. Connectors 60 and 80 form a connector pair and a channel of RDC 30. Connectors 61 and 81 form a connector pair and a channel of RDC 30. Similarly, the remaining connectors 62–66 form connector pairs with connectors 82–86, respectively, and channels of RDC 30.

Two or more RDC channels can be used to interface to multiple excitation or multiple return type sensors such as linear variable differential transformers (LVDTs)/rotational variable differential transformers (RVDTs) and three wire ratiometric sensors, such as some weight/balance sensors. A receiver channel alone (without excitation) can be used to measure independently generated signals, such as a flowmeter turbine speed signal or other frequency signal sensors.

Seven channels are shown by way of example only. It will be appreciated by those skilled in the art that the number of channels chosen for an RDC 30 is dependent on the number of sensors and their locations in a given application as well as trade-offs, such as cost vs. throughput rate, redudancy and other considerations.

RDC 30 also includes a power supply 100 that has a regulator 102 to provide regulated voltages to the various components of RDC 30. RDC 30 optionally includes discrete input/output (I/O) circuits 104 for use in providing and receiving simple discrete inputs without using up a standard RDC channel RDC 30 also provides scaling control signals to DAC 52 and input amplifier 74 via connections 92 and 94, respectively.

DSP 42 may be any suitable processor, known currently or in the future, and preferably is a digital signal processor that is capable of generating the sensor excitation signals and processing the sensor return signals. For example, DSP 42 may be a Texas Instruments Corporation part number TMS320LV5400.

DSP 42 processes discrete Fourier transform or FFT algorithms in real time to calculate the sensor parameters. DSP 42 also generates the excitation waveform by stuffing DAC 52 with look-up table values or calculated values.

For the majority of sensor applications, the measurement will be made for the impedance (inductive, capacitive or resistive) of the sensor with a sinusoidal excitation of a given frequency. To process the acquisition of any impedance type sensor, DFT (Discrete Fourier Transform) calculations are done using the DSP MAC (multiply-accumulate) instructions of DSP 42 to determine the impedance at the given excitation frequency.

Similar measurements are made on a reference element, which is a high precision resistor in order to calibrate the scaling and to define zero phase for establishing the phase of reactive impedances.

Figure 3:
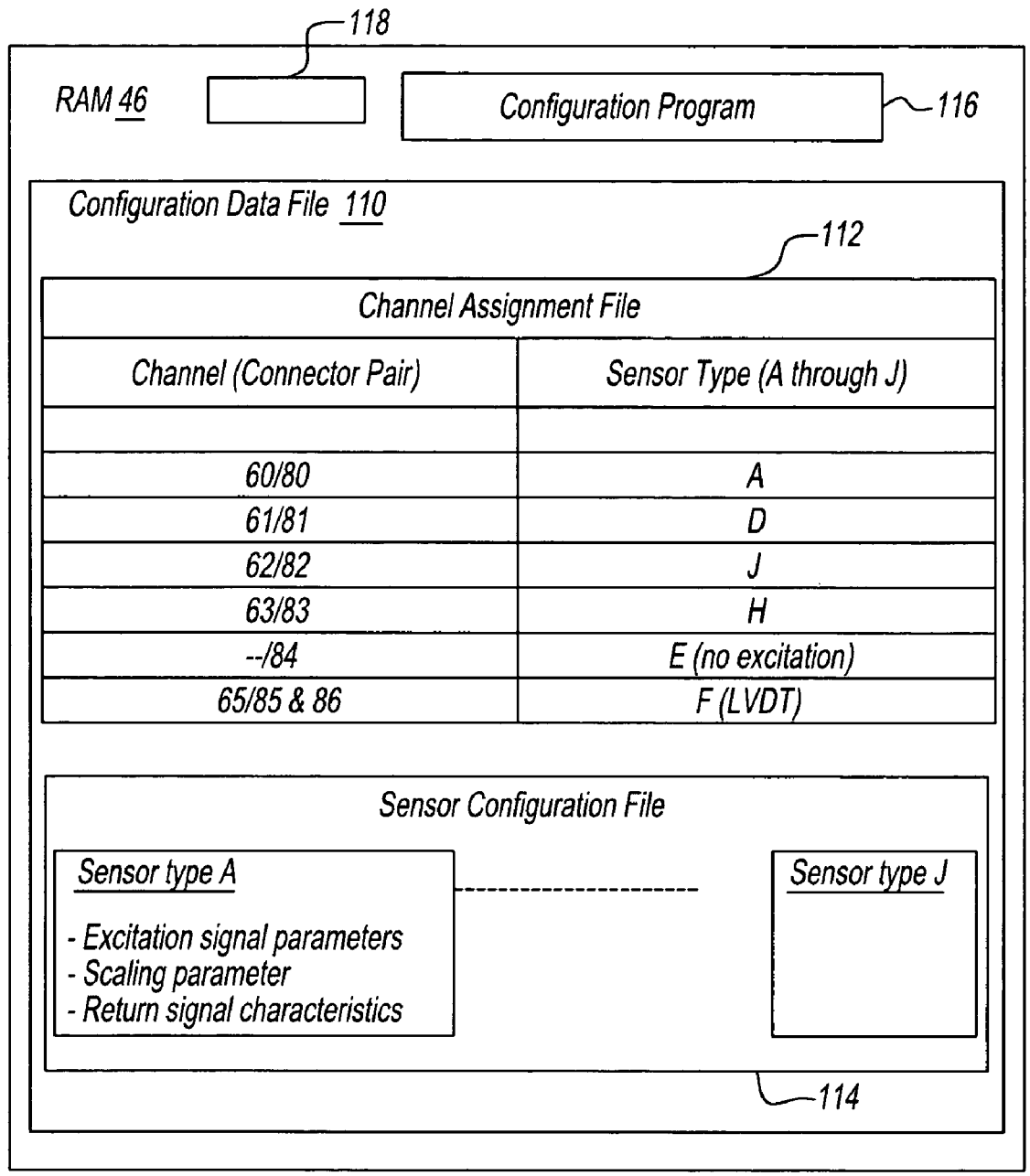
FIG. 3 is a block diagram of the random access memory of FIG. 2.

Referring to FIG. 3, RAM 46 includes a configuration program 116, a measurement procedure 118, a configuration data file 110, which includes a channel assignment file 112 and a sensor configuration file 114. Sensor configuration file 114 lists for each of a plurality of sensor types, designated as A through J, characteristics that are unique to that sensor type. For example, sensor configuration file 114 lists for sensor type A excitation signal parameters, scaling parameters and return signal characteristics. Similar characteristics would be listed for sensor types B through J.

Channel assignment file 112 lists an assignment of sensor type to each channel. For example, channel 60/80 is assigned to sensor type A. That is, channel 60/80 is connected to a sensor 32 of type A. Channel 61/81 is connected to a sensor of type B, and so on. Alternatively, as described above, two channels can be used to interface to multiple excitation or multiple return signal sensor types, or a single input channel used for non-excitation signals.

Configuration data 110 can be downloaded To RDC 30 from one or more of computers 26 upon power up of measurement system 20 or at any other suitable time. Alternatively, a sensor menu configuration table 114 could be programmed into ROM 44. This would avoid downloading thereof, thus avoiding use of the bandwidth of bus 24.

DSP 42 runs configuration program 116 to configure RDC 30 for the sensors types that are connected to the channels of RDC 30 based on the configuration data file 110. When configured for the channels of RDC 30, DSP 42 generates the desired excitation waveforms (frequency, amplitude, and wave shape), measurement circuit scaling parameters and performs discrete sampling of the sensor return signals. That is, RDC 30 provides a common circuit interface type to the sensors 32. Additional dedicated lines 120 provide for discrete logic level signal measurements and discrete outputs for rapid response functions, such as engine overspeed shutdown or dual turboprop autofeather control.

DSP 42 runs measurement procedure 118 that uses a sampling procedure or time domain processing procedure to provide precision phase angle and amplitude measurements of AC signals at specific discrete frequencies relative to the sample rate. Either of these procedures makes it possible for a single processing solution to provide precision measurements over a broad range of configurable frequencies and amplitudes. The sampling procedure may be a standard Discrete Fourier Transform (DFT) process or a Fast Fourier Transform (FFT) process. The DFT and FFT signal sampling/processing techniques provide a capability to create the general purpose common interface circuit for the RDC. Although generally not a cost-effective solution for discrete measurements, an RDC channel may be configured to do so. The time domain processing procedure may be a digital filtering process or a zero crossing detection process.

The measurement system and method of the present invention provides multiplexed multi-channel operation to support multiple sensor technologies, including but not limited to: two or three wire proximity (inductive) sensors, two or three wire capacitive (i.e., fuel gauging), LVDTs, RVDTs, synchros, strain sensors, temperature and pressure sensors, engine speed sensors, monopole torque sensors and the like.

The method of the present invention provides to each of a plurality of substantially identical RDCs 30 a configuration data file that is unique to that RDC and configures each RDC based on its unique configuration data file. The method additionally runs on each RDC 30 a measurement procedure 118 based on the configuration thereof. For example, standard sampling theory methods are preferably used to determine the desired information from the sampled data. As an example, for measurement of a Honeywell proximity sensor, two separate measurements are made—the impedance when excited with a 2 KHz sinusoidal excitation at 1V RMS, and then with a 6 KHz sinusoidal excitation at 1V RMS. At one or two microsecond intervals the following occur for a period of 1 mS.

1) a new excitation is written to excitation DAC 52,
2) the excitation and sensor return signal are sampled simultaneously, and
3) the samples are used to update four MAC (multiply-accumulate) sums needed to calculate the DFT of the return signal at the frequency of excitation. The four MAC sums are the sine and cosine MAC sums performed on both the excitation and the sensor return signal samples.

At the end of the acquisition period the DFT calculations are completed to determine the content (phase and amplitude) of the sensor signal with respect to that of a reference resistor 122 or 124 (FIG. 2). The impedance is then determined by relative comparison of the phase and amplitude between the reference resistor and the sensor. The sensor impedance and diagnostic data are then stored for transmission on bus 24.

The present invention having been thus described with particular reference to the preferred forms thereof, it will be obvious that various changes and modifications may be made therein without departing from the spirit and scope of the present invention as defined in the appended claims.

What is claimed is:

1. A measurement system comprising:
at least one computer that provides configuration data to at least one data concentrator, wherein said data concentrator comprises a processor and a plurality of channels that provide a universal interface for a plurality of sensor types, wherein said configuration data includes an assignment of each of said channels to one of said sensor types, said configuration data further includes a configuration file that designates excitation signal parameters and sensor return signal characteristics for each sensor type, and wherein said processor runs a configuration program that configures said processor based on said assignment and said processor generates sensor excitation signals and processes sensor return signals based on said excitation signal parameters and said sensor return signal characteristics and/or said assigned sensor types.

2. The measurement system of claim 1, wherein said processor executes discrete Fourier transform procedures to provide precision measurements over a broad range of configurable frequencies and amplitudes.

3. The measurement system of claim 1, wherein said data concentrator is one of a plurality of substantially identical data concentrators, and wherein the configuration data is unique to each of said data concentrators.

4. A measurement method comprising:
providing configuration data to at least one data concentrator from at least one computer coupled to the at least one data concentrator that comprises a processor and a plurality of channels that provide a universal interface to a plurality of sensor types, wherein said configuration data includes an assignment of each of said channels to one of said sensor types and wherein said configuration data further includes a configuration file that designates excitation signal parameters and sensor return signal characteristics for each sensor type;
configuring said processor and said channels based on said assignment;
running a measurement procedure that via said channels provides sensor excitation signals and receives sensor return signals that are based on said excitation signals parameters and said sensor return signal characteristics and/or said assigned sensor types.

5. The method of claim 4, wherein said step of running uses a sampling procedure or a time domain processing procedure to provide to provide precision measurements over a broad range of configurable frequencies and amplitudes.

6. The method of claim 5, wherein said sampling procedure is selected from the group consisting of: discrete Fourier transform and fast Fourier transform.

7. The method of claim 5, wherein said time domain processing procedure is selected from the group consisting of: digital filtering and zero crossing detection.

8. The method of claim 4, wherein said data concentrator is one of a plurality of substantially identical data concentrators, and wherein the configuration data is unique to each of said data concentrators.

* * * * *